United States Patent

Koos et al.

Patent Number: 6,072,838
Date of Patent: * Jun. 6, 2000

[54] COMMUNICATION SCHEME USING NON-COHERENT FREQUENCY DETECTION OF TRELLIS-BASED CODING OF PLURAL TRANSMISSION FREQUENCIES PER BAUD

[75] Inventors: Larry W. Koos, Sanford; William M. Koos, Jr., Altamonte Springs; Peter E. Mallory, New Smyrna Beach, all of Fla.

[73] Assignee: Koos Technical Services, Inc., Longwood, Fla.

[ * ] Notice: This patent is subject to a terminal disclaimer.

[21] Appl. No.: 09/287,047

[22] Filed: Apr. 6, 1999

Related U.S. Application Data

[63] Continuation of application No. 08/391,965, Feb. 21, 1995.

[51] Int. Cl.[7] .............................. H04L 27/28; H04L 5/12; H04L 23/02
[52] U.S. Cl. ..................... 375/242; 375/265; 371/43.4; 455/61
[58] Field of Search ........................ 375/242, 243, 375/244, 245, 246, 248–251, 253, 260, 262, 265, 343, 341, 316; 341/50, 51, 143, 173; 371/37.1, 43.4; 455/3.2, 61; 348/388, 426

[56] References Cited

U.S. PATENT DOCUMENTS

| | | | |
|---|---|---|---|
| 4,457,004 | 6/1984 | Gersho et al. | 375/265 |
| 4,945,549 | 7/1990 | Simon et al. | 371/43 |
| 4,980,897 | 12/1990 | Decker et al. | 375/265 |
| 5,204,874 | 4/1993 | Falconer et al. | 370/209 |
| 5,233,629 | 8/1993 | Paik et al. | 375/265 |
| 5,243,629 | 9/1993 | Wei | 375/265 |
| 5,418,798 | 5/1995 | Wei | 275/265 |
| 5,926,508 | 7/1999 | Koos et al. | 375/242 |

*Primary Examiner*—Chi H. Pham
*Assistant Examiner*—Bryan Webster
*Attorney, Agent, or Firm*—Charles E. Wands

[57] ABSTRACT

A reduced cost digital data modulation and demodulation scheme for very small aperture terminal (VSAT) satellite communication systems combines non-coherent frequency detection with trellis-coded, multi-frequency modulation. The technique is robust to phase noise and frequency uncertainty and is capable of achieving the performance of rate one-half phase shift keyed modulation. The code width of data to be transmitted bears a prescribed relationship to the size of a multiple frequency set and the selection of a given combination of frequencies within that set for transmission during a respective baud. One portion the data is convolutionally encoded and provides a pointer to one of plural groups of orthogonal signal sets associated with frequencies into which the multiple frequency set has been partitioned. Another portion of the data identifies the frequency combination within the group pointed to by the one portion. The combined portions encode a multi-frequency waveform transmitted to the receiver site. At the receiver site, the sequence of multi-frequency tones produced by the transmitter encoder is detected by non-coherent frequency detection. For each baud, the outputs of matched filters are examined to determine the most likely set of frequencies to have been transmitted during that baud. Most likely frequency combination determinations provide soft decision inputs to a Viterbi decoder.

6 Claims, 2 Drawing Sheets

```
1    1    1    0    0    0    0    0    0    0    0    0  ← 3/12 PATTERN

|ON  ON   ON |←----------- OFF -------------→

F1   F2   F3   F4   F5   F6   F7   F8   F9   F10  F11  F12

1    0    0    1    1    0    0    0    0    0    0    0  ← 3/12 PATTERN

ON   OFF  OFF  ON   ON  ←-------- OFF ----------→
```

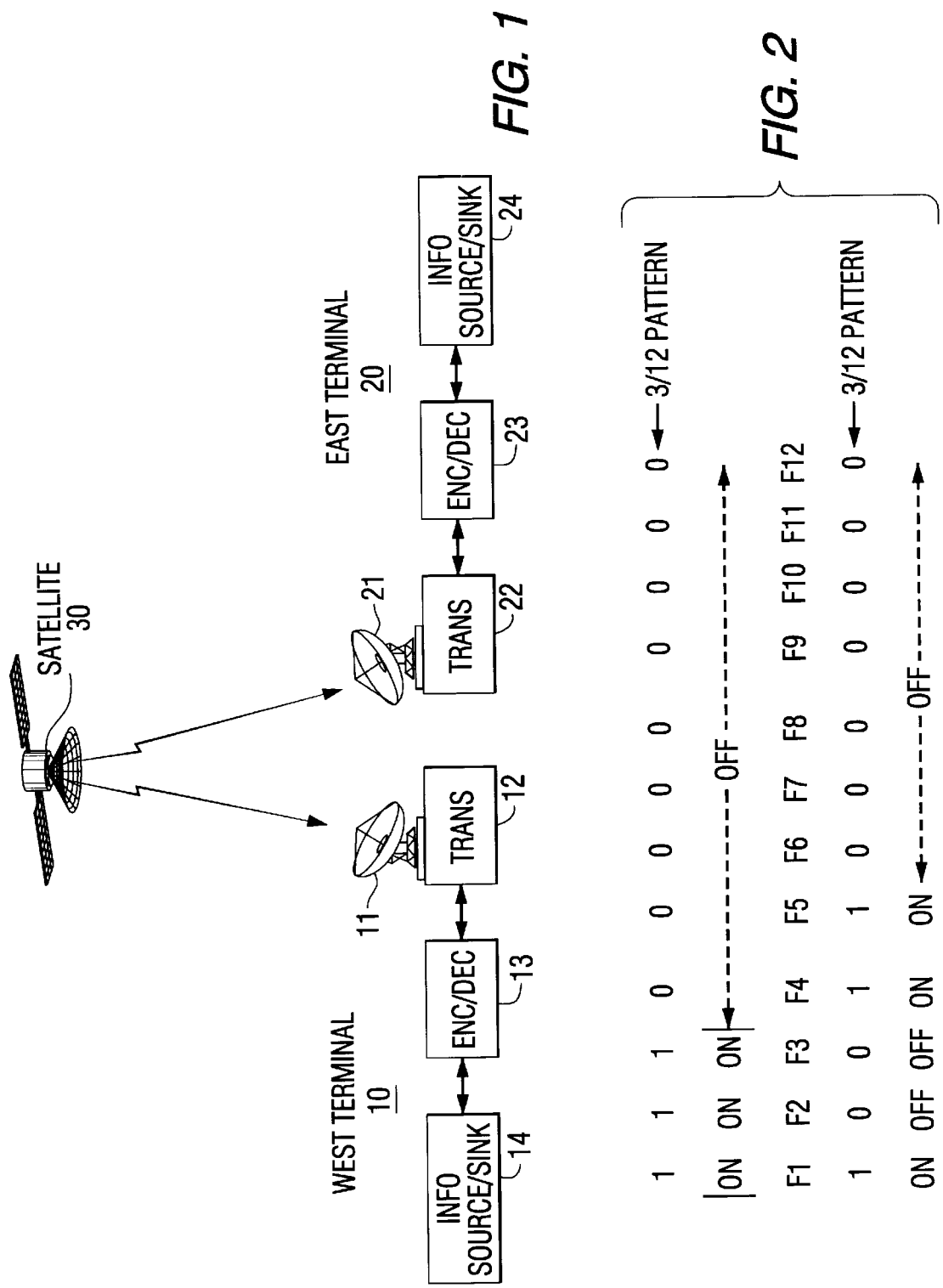

COMMUNICATION SCHEME USING NON-COHERENT FREQUENCY DETECTION OF TRELLIS-BASED CODING OF PLURAL TRANSMISSION FREQUENCIES PER BAUD

This is a continuation of application Ser. No. 08/391,965, filed Feb. 21, 1995—pending.

FIELD OF THE INVENTION

The present invention relates in general to communication systems, and is particularly directed to a reduced cost digital data transmission scheme intended for use with very small aperture terminal (VSAT) satellite communication systems, which combines non-coherent frequency detection with a trellis-coded, orthogonal signal set, from which multi-frequency modulation is produced, in a manner that is robust to phase noise and frequency uncertainty and is capable of achieving the performance of rate one-half phase shift keyed modulation.

BACKGROUND OF THE INVENTION

The vast majority of suppliers of satellite communication equipment currently employ some form of phase shift keying (PSK) modulation technique (e.g., BPSK or QPSK) in combination with Viterbi/sequential decoding for data recovery. At the relatively high data rates (e.g. on the order of one megabit per second or more), at which such systems have been designed to operate, because the maximum frequency uncertainty (on the order of 200 KHz, for example) and the bandwidth of the low noise block's (LNB's) phase noise is relatively small compared to the data rate, bit error rate performance is quite good and essentially insensitive to phase noise.

In today's telecommunication markets, both within the U.S. and overseas, however, a demand has arisen for VSAT equipment that is capable of operating at considerably lower data rates (e.g. on the order of 1200 bps to 128 Kbps). At such data rates, frequency uncertainty and phase noise become significant problems. The phase noise problem is particularly acute at such lower data rates, where phase noise power, which tends to be shaped around the carrier, occupies a larger percentage of the transmitted power.

One way to reduce the phase noise (and associated frequency uncertainty) problem in a PSK system is to employ a very stable (and expensive) low noise block down converter (LNB) at the VSAT terminal. Obviously, such an approach does not provide a viable solution to the problem, since a VSAT terminal, by its very nature, is intended to provide relatively low cost satellite communication service to the customer.

Another way to avoid the phase noise and frequency uncertainty problem is to use non-coherent frequency shift keying (FSK) having a frequency constellation containing a relatively large number of frequencies (M-ary (e.g. 16-ary) FSK), combined with forward error correction encoding. Although this technique is theoretically capable of approximating the bit error performance of rate one-half coded PSK modulation, it suffers from a substantial bandwidth usage penalty, resulting in a considerable increase in the cost of link usage.

SUMMARY OF THE INVENTION

In accordance with the present invention, we have developed a new and improved, relatively low cost, digital data transmission scheme, especially intended for use with VSAT satellite communication systems, which trellis-encodes data to be transmitted into a waveform comprised of an orthogonal signal set, and non-coherently detects and trellis-decodes the wave form to derive the data. The present invention combines non-coherent frequency detection with trellis-coded, multi-frequency modulation, in such a manner that it is immune to phase noise, so that it does not require expensive LNB components, while effectively achieving the performance of rate one-half phase shift keyed modulation.

Pursuant to the present invention, digital data to be transmitted is encoded to a prescribed code width. The code width bears a prescribed relationship to the size of a multiple frequency set and the selection of a given combination of frequencies within that multiple frequency set for transmission during a respective baud. In particular, this prescribed relationship is such that a first code portion of an encoded data sample, when subjected to a convolutional code for error correction purposes, provides a pointer to one of plural groups of frequencies into which the multiple frequency set has been partitioned. Each group contains a plurality of frequency combinations of the same number of frequencies per combination, but with the frequencies of each combination being different from those of any other combination, either within the same or another multi-frequency group.

The remaining or second code portion of the encoded data sample identifies the frequency combination within the group pointed to by the first code portion of the encoded data sample. Thus the combined first and second code portions of each encoded data sample produce, during a respective baud, a prescribed multi-frequency carrier waveform, which is transmitted from the transmitter site to the receiver site.

At the receiver site, a sequence of multi-frequency carrier waveforms respectively associated with successive data words that have been encoded at the transmitter site is detected by non-coherent frequency detection. In particular, the multi-frequency carrier waveform is applied to a set of matched filters, the number and frequencies of which correspond to those of the multi-frequency set employed at the transmitter. For each baud, the outputs of the matched filters are examined to determine the most likely set of frequencies to have been transmitted during that baud. For successive bauds, these most likely frequency combination determinations are used as soft decision inputs to a Viterbi decoder, the output of which is a sequence of digital codes representative of what has been determined to have been encoded at the transmitter.

In order to achieve a bit error rate performance that is effectively equivalent to that of rate one-half PSK, the present invention incorporates two error reduction operators into its encoding mechanism. The first involves assigning frequency combinations within a respective group, such that associated digital code patterns representative of such frequency combinations (as represented by the second code portion of an encoded data sample) have Hamming distances therebetween that are greater than the Hamming distance between any digital code pattern of that respective group and the digital code pattern of any other group. Since the minimum Hamming distance between digital code patterns of different groups is two, then the minimum Hamming distance between digital code patterns of the same group is four. This doubling of the intra-group Hamming distance provides sufficient error protection for enabling the non-coherent detector to make the correct choice of the frequency combination within the group, once the group has been identified.

The second error reduction operator involves encoding the first code portion of an encoded data sample by a convolutional code for error correction purposes. As pointed out above, the first code portion provides a pointer to one of plural groups of frequencies into which the multiple frequency set has been partitioned. Although the data sample word be originally encoded to the same code width as that obtained by combining the convolution-encoded first code portion and the second code portion, by simply parsing the data word into first and second code portions for group and frequency combination selection, to do so could result in an unacceptable ambiguity in the receiver as to the choice of which group of frequencies was transmitted.

Encoding the data to a code width smaller than that eventually obtained by combining the convolutional-encoded first code portion and second code portion, and then subjecting the (group-identification) first code portion to a forward error-correction convolutional code, effectively translates the asymptotic performance characteristic associated with an uncoded first code portion downward along the EBN0 axis, and brings it into effectively alignment with the asymptotic performance characteristic associated with the second code portion. As a consequence, the composite asymptotic performance characteristic associated with the convolutional-encoded first code portion and the second code portion (having a Hamming distance of four) falls within an acceptable EBN0 variation.

BRIEF DESCRIPTION OF THE DRAWINGS

FIG. 1 diagrammatically illustrates a reduced complexity illustration of a VSAT communication system in which the present invention may be incorporated;

FIG. 2 is a non-limiting example illustrating the manner in which a digital code vector may be used to specify which ones of a plurality of different carrier frequency tones are to be turned on or off during a respective baud;

DETAILED DESCRIPTION

Figure 3:
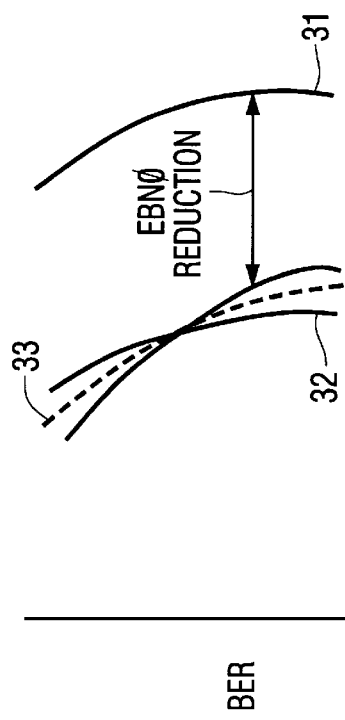
FIG. 3 diagrammatically illustrates the manner in which a convolutional forward error correction code effectively translates an asymptotic performance characteristic associated with an uncoded first code portion downward along the EBN0 axis to bring it into effective alignment with the asymptotic performance characteristic associated with a second (four bit) code portion, whose associated twelve bit patterns have a Hamming distance of four.

Before describing in detail the new and improved trellis-coded, multi-frequency modulation communication mechanism in accordance with the present invention, it should be observed that the invention resides primarily in what is effectively an integration of conventional communication system components and associated signalling interfaces. Consequently, the configuration of the components of the system and the manner in which they are interfaced with other communication equipment of a conventional VSAT communications system have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Referring initially to FIG. 1, a reduced complexity illustration of a VSAT communication system of standard configuration in which the present invention may be incorporated is diagrammatically shown as comprising a 'west' VSAT earth station or terminal 10 and an 'east' VSAT earth station or terminal 20, which communicate with each other over associated uplink and downlink channels through a satellite 30. West terminal 10 includes a VSAT antenna 11 and an associated transceiver unit 12, which is coupled to an encoder/decoder unit 13, to which an information source/sink 14 of the west end user is coupled. Similarly, east terminal 20 includes a VSAT antenna 21 and an associated transceiver unit 22, which is coupled to an encoder/decoder unit 23, to which an information source/sink 24 of the west end user is coupled.

At a respective terminal, incoming data from an associated information source, that has been digitized to some prescribed code width, is encoded and IF up-converted onto an uplink carrier for transmission through the satellite 30. From the satellite, the transmission is downlinked to a receiving station, where it is IF down-converted and then decoded and output to a destination customer's equipment (information sink).

As pointed out previously, for the relatively high data rates (1 Mb/s or more) at which such VSAT systems customarily operate, rate one-half phase shift keying (PSK) modulation can be satisfactorily employed in combination with Viterbi/sequential decoding for data recovery, since the maximum frequency uncertainty (and accompanying phase noise) is relatively small compared to the data rate. However, to meet the current demand for VSAT equipment that provides cost effective service at data rates on the order of 1200 bps to 128 Kbps, the previously described frequency uncertainty and accompanying phase noise problem must be solved.

The present invention successfully circumvents this frequency uncertainty/phase noise problem, by trellis-encoding data to be transmitted into a waveform comprised of an orthogonal signal set, and non-coherently detects and trellis-decodes the wave form to derive the data. As will be described, the invention combines non-coherent frequency detection with a prescribed trellis-coded, multi-frequency encoding scheme that achieves a composite asymptotic bit error rate performance characteristic having an EBN0 variation effectively equivalent to that of current requirements for rate one-half PSK.

In order to achieve robust non-coherent frequency detection, without suffering a substantial bandwidth penalty, the communication mechanism according to the present invention encodes each respective data value as a plurality of carrier frequencies and transmits a multi-frequency, composite waveform during the baud associated with that data value. The number of carrier frequencies transmitted per baud is a prescribed number K selected from a larger set or pool of M available frequencies, where M is considerably larger than K, with a one baud spacing between the M frequencies of the set.

As will be described, for any given data sample value, its multi-bit digital code (one/zero pattern) is processed to specify a particular set of K frequencies taken from the available pool of N frequencies in such a manner as to ensure sufficient separation among code patterns that will realize a non-coherent frequency detection-based data recovery output having a bit error rate comparable to the current industry standard for rate one-half PSK of $10^{-7}$ BER at 5½ dB EBN0.

FIG. 2 is a non-limiting example illustrating the manner in which a digital code pattern or vector may be used to specify which ones of a plurality K of different frequency tones are to be turned on or off during a respective baud. Each bit position of the 'frequency pattern' digital code vector is associated with a respectively different carrier frequency. Although each digital code vector is depicted as an 'M equals twelve' bit code, it is to be understood that such a vector length is given for purposes of illustration. Other vector lengths may be used without departing from the encoding mechanism of the invention. As will be described, the choice of a code vector length of M equals twelve has been shown to provide a practical implementation of the encoder.

Within a respective frequency pattern code vector of M bits in length, each of a plurality of K 'one' bits represents turning its associated frequency on during the baud, and each of the remaining 'zero' bits represents turning its associated frequency off during the baud. Thus, for the illustrated example of the three-out-of-twelve (K/M=3/12) frequency pattern code 1110 0000 0000, since each of the first three bit positions associated with frequencies F1, F2 and F3 has a binary value of '1', frequencies F1, F2 and F3 are to be turned on during the baud, while frequencies F4 . . . F12 are to be turned off during the baud. Also shown in FIG. 2 is another three-out-out-of-twelve frequency pattern code 1001 1000 0000, which represents turning on a different set of three frequencies: F1, F4 and F5 during the baud, while frequencies F2, F3 and F6 . . . F12 are to be turned off during the baud.

A comparison of the two (3/12) frequency pattern codes of FIG. 2 reveals that each has a Hamming distance of four (associated with bits 2, 3, 4 and 5). It has been determined that a Hamming distance of four or greater in a multibit code vector, the bit positions of which are associated with the generation of a multi-frequency tone for data encoding and non-coherent detection in accordance with the present invention, will ensure that non-coherent frequency detection coupled with a Viterbi decoder will achieve the above-described sought after BER performance.

It should be noted that not every digital K-out-of-M code vector will have such a Hamming distance (four) with respect to every other vector of that code width resolution. Fortunately, an article by A. E. Brouwer et al, entitled: "A New Table of Constant Weight Codes," IEEE Transactions on Information Theory, Vol. 36, No. 6, November 1990, pp 1335, tabulates boundaries on the maximum number of code vectors of prescribed code width resolutions for specified Hamming distances.

In particular, the Brouwer et al article reveals that for any arbitrary group of respectively different three-out-of twelve digital code vectors, there is a maximum of twenty patterns that satisfy the minimum Hamming mutual distance of four criterion. This does not mean that there is only one, twenty member set that satisfies this Hamming requirement. Indeed, the total number of combinations of twelve items taken three at the time is 220. This total of 220 three-out-of-twelve bit patterns can be grouped into eleven groups of twenty each, such that each of the twenty (3/12) vectors satisfies the minimum Hamming mutual distance of four criterion. Although the Brouwer et al article does not indicate which patterns satisfy a given Hamming distance criterion or how one goes about determining the patterns associated with a given criterion (it simply tabulates that they exist), a determination of some or all of the eleven groups of twenty, three out-of-twelve patterns that satisfy the minimum Hamming distance of four criterion is essentially a trial and error evaluation exercise, which is readily accomplished by a skilled practitioner.

Advantageously, since a three-out-of-twelve pattern provides a total of 220 different code vectors, it encompasses a reasonably sized quantity (seven bits as a non-limiting example) that is representable in binary (power of two) format, specifically ($N=2^7$) 128 vectors, so that such patterns can be readily processed by digital signal processing circuitry, in which the code width of a digital data word is seven bits. In order to comply with the Hamming distance-four grouping limitation described in the Brouwer et al article, the N=128 vectors are partitioned into (J=8) groups of (L=16) three-out-of-twelve patterns. Namely, since the Brouwer et al article tabulates that one can assemble up to twenty members in an arbitrary group of three-out-of-twelve patterns of Hamming distance four, each of which has a Hamming distance of four, partitioning 128 three-out-of-twelve patterns into groups that do not exceed twenty each (e.g., L=16) ensures that each group will satisfy the distance four Hamming criterion.

In accordance with the present invention, to select which of the 128 patterns is to be used to encode a (seven bit) data word, each data word is subdivided into two code portions, one of which is used to select one of the eight groups, and a second of which is used to specify a particular three-out-of twelve tone-associated pattern within the selected group of sixteen. Although an original data sample could be encoded as seven bits and then simply parsed into a first code portion of three bits and a second code portion of four bits, for group selection and pattern selection, respectively, to do so could result in an unacceptable ambiguity in the receiver's decoder as to the choice of which group was transmitted.

To solve this potential ambiguity, the present invention encodes each data word to a lesser number of bits than required for group and pattern identification (e.g. a data word length D of six bits rather than seven) and then expands the data word size to the required code width. More particularly, for group selection, a first portion (e.g. C=2 bits) of the data word is subjected to a forward error correction (2/3) convolutional encoder, which produces the necessary (K=3) bit field used to identify which of the eight groups contains the three-out-of-twelve tone to be transmitted for the data value of interest. Since this three bit field identifies a particular group of tone triplets, the remaining (P=4) bits are used to identify which tone triplet within the group is to be transmitted. As a result of this sub-encoding mechanism, the multi-frequency carrier waveform for any input data code value is completely specified.

As diagrammatically illustrated in FIG. 3, the use of a convolutional forward error correction code to expand (C=2) originally encoded bits into (K=3) bits necessary for group identification effectively translates the asymptotic performance characteristic 31 associated with an uncoded first code portion downward along the EBN0 axis, and brings it into effective alignment with the asymptotic performance characteristic 32 associated with the second (P=4) bit code portion, whose associated twelve bit patterns have a Hamming distance of four. As a consequence, the composite asymptotic performance characteristic 33 associated with the convolutional-encoded first code portion and the second code portion falls within an acceptable EBN0 variation.

Figure 4:
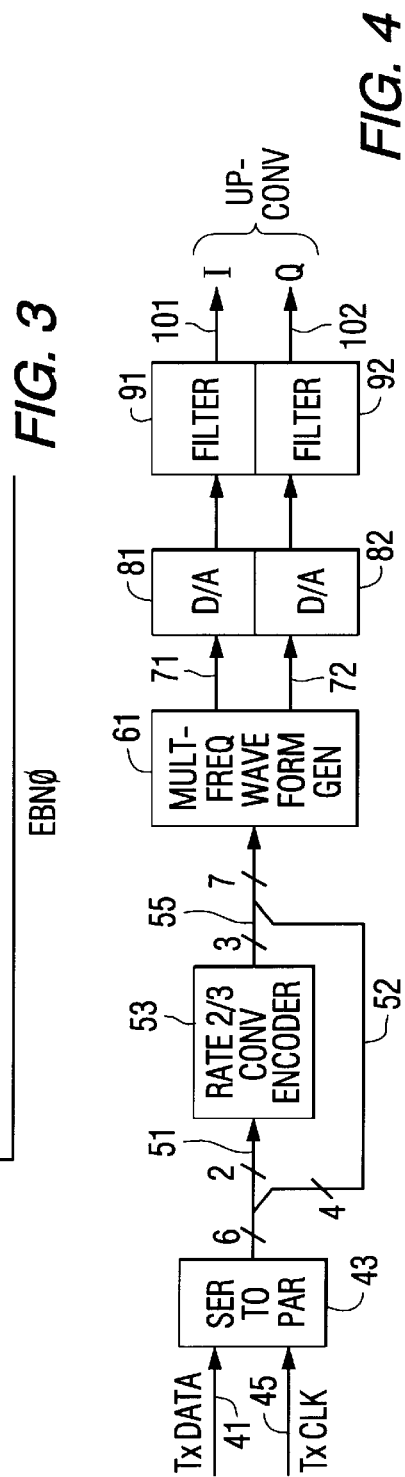
FIG. 4 diagrammatically illustrates the configuration of a multi-frequency waveform encoder according to the present invention.

FIG. 4 diagrammatically illustrates the configuration of a waveform encoder portion of the encoder/decoder equipment at a respective VSAT site, which is used to drive the up-converter circuitry of the transmitter unit of the terminal. To avoid unnecessarily cluttering the drawing, the transmit clock generator circuitry, which is conventional, is not shown. An incoming serial digital data stream to be transmitted supplied over a transmit data link 41 is coupled to a serial-to-parallel converter 43, which is clocked by a transmit data clock supplied over link 45. Serial-to-parallel converter outputs successive data words representative of successive data samples, of six bits each.

Pursuant to the invention, a first (C=2 bits) portion of this six bit data word is coupled over link 51 to a rate 2/3 convolutional encoder 53, which encodes its two bit input into three bits on output link 55. The remaining four-bit portion of the six bit data word is coupled over link 52 and combined with the three bits on link 55 to form a seven bit converted data word, which is applied to a multi-frequency waveform generator 61. Waveform generator 61 is preferably implemented as a digital ASIC (application specific integrated circuit) and is configured to translate the seven bit input code into a three carrier frequency output waveform.

For this purpose, waveform generator 61 may comprise combinational/matrix logic circuitry and associated look-up tables, which uses the three bit convolutional code converted portion of the input data word, output by encoder 51, to select one of the eight groups of sixteen tone triplet code patterns each. Generator 61 uses the other four bits of the seven bit pattern on link 57 to specify one of the sixteen tone triplets of the selected group. A digitally generated version of the selected multi-frequency waveform is applied over respective I and Q channels 71 and 72 and applied to digital-to-analog conversion units 81 and 82, respectively, which output analog signals corresponding to the composite tone triplet. The respective I and Q channels are then filtered in respective filters 91 and 92 and output over links 101 and 102 to respective I and Q channel feeds to the transmitter's associated IF channel up-converter unit.

Figure 5:
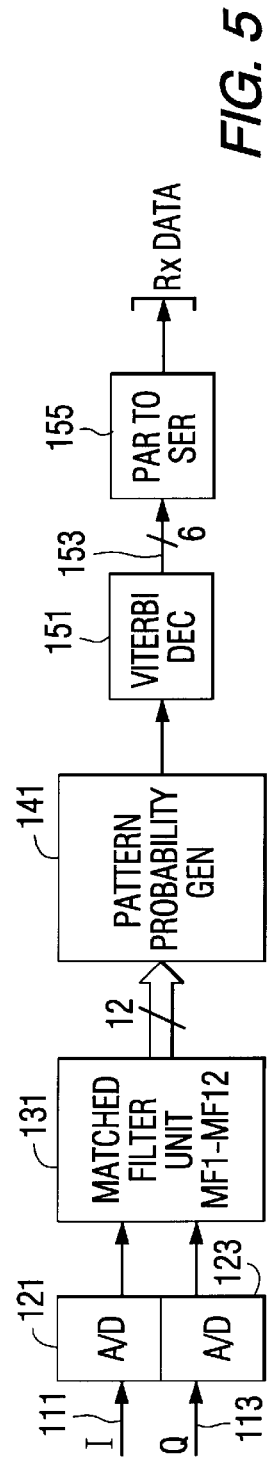
FIG. 5 diagrammatically illustrates the configuration of a non-coherent frequency detector and decoder according to the present invention.

FIG. 5 diagrammatically illustrates the configuration of the demodulator portion of the encoder/decoder equipment at a respective VSAT site, which is coupled to the down-converter circuitry of the receiver unit of the terminal. Like FIG. 4, FIG. 5 does not show clock generation (recovery) circuitry, which is conventional, in order to avoid unnecessarily cluttering the drawing. Received I and Q channels from the receiving terminal's down converter are coupled over respective links 111 and 113 to associated analog-to-digital converter units 121 and 123, which output digitally formatted versions of the received tone triplet.

The tone triplet waveform signals are applied to a matched filter unit 131 which contains a set of twelve matched filters MF1–MF12, each of which is associated with a respective one of the twelve frequency/tones F1–F12 employed at the transmitter site for generating the three-out-of-twelve tone triplets, as described above. The output of each matched filter MFi within unit 131 is a digital value representative of the energy received by that filter during a prescribed baud. In the absence of noise, in response to receipt of a three carrier frequency waveform, three of the matched filters within unit 131 will produce very large numerical values, while the outputs of the remaining nine filters should be zero. However, since noise is present, each matched filter output will have some finite value.

Each of the matched filter outputs is coupled to a pattern probability generator 141 which, like waveform generator 61, is preferably implemented as a digital ASIC and is configured to generate soft decision inputs to a downstream Viterbi decoder 151 as to the likelihood of which group and pattern within that group has been received for a given baud. For successive bauds, therefore, pattern probability generator 141 will supply soft decision inputs to the Viterbi decoder 151 of the most likely sequence of groups that have been transmitted, upon which the Viterbi decoder relies in generating successive outputs of the transmitted encoded data words (prior to deconvolution of the group designator bits).

To this end, the signal processing/logic circuitry within pattern probability generator 141 is configured to examine the numerical outputs of each of the twelve matched filters MF1–MF12. These matched filter values are then compared with stored copies of all 128 three-out-of-twelve patterns that are capable of being transmitted during any given baud to locate the most likely transmitted tone pattern.

For this purpose, the dot product between the numerical output values provided by the matched filters and the respective patterns is formed, thereby producing 128 dot product quantities $\Gamma_1$–$\Gamma_{128}$. These quantities $\Gamma_1$–$\Gamma_{128}$ are then grouped in groups of sixteen as: $(\Gamma_1$–$\Gamma_{16})$, $(\Gamma_{17}$–$\Gamma_{32})$, . . . , $(\Gamma_{113}$–$\Gamma_{128})$. The largest numerical quantity $\Gamma_{1i}$ within each group of sixteen is then selected to represent the likelihood $\tau_i$ that its particular group was transmitted during the baud. The eight derived likelihood values $\tau_1$–$\tau_8$ are output as soft decision data values for use by Viterbi decoder 151 during its processing of sequential group soft decision data to identify which groups have been transmitted during successive bauds.

Each group in the sequence decoded by the Viterbi decoder 151 produces a two bit code, corresponding to that supplied to the rate 2/3 convolutional encoder 53 at the transmitter (FIG. 4, described above). For a respective group decision made by the Viterbi decoder 151, the four bit code associated with pattern for that baud, which was the basis for quantity $\tau_i$, is combined with the two bit code output, so as to regenerate the original six bit data word. The decoded six bit data word is then coupled over link 153 to parallel-to-serial converter 155 which outputs the recovered data to associated user equipment.

As will be appreciated from the foregoing description, by combining non-coherent frequency detection with trellis-coded, multi-frequency modulation, as described above, the present invention is able to provide a relatively low cost (not requiring expensive LNB components) digital communication technique, that not only meets the above-described demand for VSAT equipment that is capable of operating at considerably lower data rates (e.g. on the order of 1200 bps to 128 Kbps), but in doing so achieves the performance of rate one-half phase shift keyed modulation.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of recovering digital data containing successive digital data words that have been trellis-encoded into successive multi carrier frequency waveforms, a respective multi carrier frequency waveform being formed of a plurality of respectively different, simultaneously occurring carrier frequencies that have been selected in accordance with digital code values of a respective one of said successive digital data words, comprising the steps of:

(a) detecting said successive multi carrier frequency waveforms; and (b) processing said successive multi carrier frequency waveforms by means of a trellis decoder to recover said successive digital data words of said digital data.

2. A method according to claim 1, wherein said multi carrier waveform contains a prescribed combination of a set of K simultaneously transmitted ones of M respectively different carrier frequencies.

3. A method of transmitting data over a communication link from a transmit site to a receive site comprising the steps of:

(a) at said transmit site, trellis-encoding data to be transmitted into a multi carrier waveform containing a plurality of respectively different, simultaneously occurring carrier frequencies that are selected in accordance an orthogonal signal set of a dimension greater than two; and (b) at said receive site, non-coherently detecting and trellis-decoding said waveform to derive said data.

4. A method according to claim 3, wherein step (a) comprises trellis-encoding data to be transmitted into said multi carrier waveform as a prescribed combination of a set of K simultaneously transmitted ones of M respectively different carrier frequencies.

5. A system for transmitting data over a communication link from a transmit site to a receive site comprising:

at said transmit site, a trellis-based encoder which is operative to encode successive words of data into successive multi carrier waveforms, a respective multi carrier waveform containing a plurality of respectively different, simultaneously occurring carrier frequencies selected in accordance with digital code values of a respective one of successive digital data words of said data; and at said receive site, a non-coherent frequency detector which is operative to detect the respectively different, simultaneously occurring carrier frequencies of said successive multi carrier waveforms, and derive successive digital data words of said data.

6. A system according to claim 5, wherein said trellis-based encoder is operative to trellis-encode data to be transmitted into said multi carrier waveform as a prescribed combination of a set of K simultaneously transmitted ones of M respectively different carrier frequencies.

\* \* \* \* \*